Dec. 30, 1930.  E. L. GORDON  1,786,606
FROZEN CONFECTION
Filed Sept. 10, 1930

E. L. Gordon
INVENTOR
BY Victor J. Evans
ATTORNEY

Patented Dec. 30, 1930

1,786,606

UNITED STATES PATENT OFFICE

EDWARD L. GORDON, OF PITTSBURGH, PENNSYLVANIA

FROZEN CONFECTION

Application filed September 10, 1930. Serial No. 481,043.

This invention relates to frozen confections, and is a continuation in part of my invention entitled Confections for which I filed application Serial No. 326,210 in the United States Patent Office on December 15, 1928.

The invention includes among its objects a leak proof edible casing within which is disposed a mass of frozen delicacy such as ice cream, sherbets, ices, custards and the like, to provide a frozen confection that can be readily handled by the consumer without soiling hands and clothing and the casing and its contents can be bitten and chewed simultaneously without fear of separation, breaking or crumbling of the casing, until the contents is consumed, and the container is of a material whereby it can be chewed indefinitely so that the enjoyment of the confection lingers on.

A very important object of the present invention is to provide a casing with an open portion which materially decreases the cost of manufacturing the same, as well as provides means whereby the nature and flavor of the contents of the casing can be readily seen and ascertained at a glance.

A further object of the present invention is to provide a confection of the character set forth that is extremely palatable and this feature taken together with the convenient manner one can handle and eat the same, causes the confection to be very desirable by grown-ups as well as children.

Another object of the invention is to provide a frozen confection that can be cut into sections or blocks in an easy and expeditious manner and served accordingly, without fear of crumbling or cracking of the casing.

With the above and other objects in view, the invention further includes the following novel features and details, to be hereinafter more fully described, illustrated in the accompanying drawings and pointed out in the appended claims.

Figure 1:
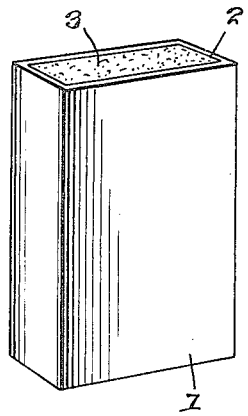
Figure 1 is a perspective view illustrating one form of my invention.
Figure 2:
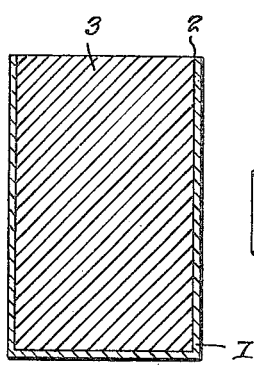
Figure 2 is a vertical sectional view taken therethrough.
Figure 3:
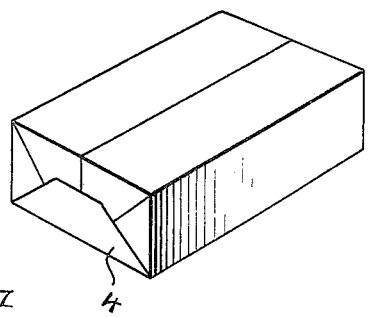
Figure 3 is a perspective view showing this form of the invention wrapped.

Referring to the drawings in detail, and particularly to the form of the invention as shown in Figures 1 to 3 inclusive, the reference numeral 1 indicates what may be termed a casing that is substantially in the form of a sheath which is composed of chewing gum of any kind and flavor. The casing 1 as shown is provided with an open top 2, but it will be obvious that one or more of the sides may be open without departing from the spirit of the invention provided of course the casing 1 acts in the capacity as such for receiving and retaining a frozen edible product such as ice cream or the like.

The frozen edible product or delicacy which is indicated by the reference numeral 3 is adapted to fill the casing 1 as shown in Figure 2, and the casing is relatively thin but of sufficient thickness to form a self-sustaining and form retaining casing as will be apparent, and the confection in the form of the invention just described is to be wrapped as shown in Figure 3, in wax paper or other suitable covering such as indicated by the reference numeral 4.

One method of manufacturing the form of the invention as shown in Figures 1 to 3 inclusive consists in forming the casing or sheath from a blank sheet of chewing gum which has been previously rolled to the proper thickness. As I now manufacture the confection I use a thickness of gum of approximately three one-hundredths of an inch. However, I do not wish to limit myself to any thickness, as the thickness would be governed by the amount of gum desired or the amount of filler in the gum such as sugar, flavoring and other aqueous solubles which might be used to give the gum bulk. The blank sheet of gum is elongated to provide the vertical walls of the casing with a flap laterally extending from the sheet to provide the bottom wall. These sheets may be arranged in strips and passed through a cutting machine for cutting the strips into the sheets.

The machine may also have a folding means whereby the sheets are folded into casing formation as shown in Figure 1, and the bottom edges of the vertical walls in forming the casing are bent inwardly to receive the free edges of the bottom wall, and these edges are moistened so that they will readily adhere to each other when slight pressure is applied thereto. After the casings have been completed, they can be disposed in metal containers, one casing for each container and then filled with the cream mixture, sherbets, ices, custards and the like. It is desirable that the metal containers be in the form of a conveyor whereby they can be run through a brine tank, of a length so that the contents of the casings will be in a frozen condition by the time the filled casings in their metal containers reach the discharging end of said brine tank, it being obvious that the metal containers are disposed within the brine a sufficient depth to allow the brine to freeze the cream in the time specified.

The frozen confection which consists of the casing and its contents or filler is then wrapped in suitable paper such as wax paper or the like so that the nature and flavor of the filling can be readily seen through the paper.

Figure 4:
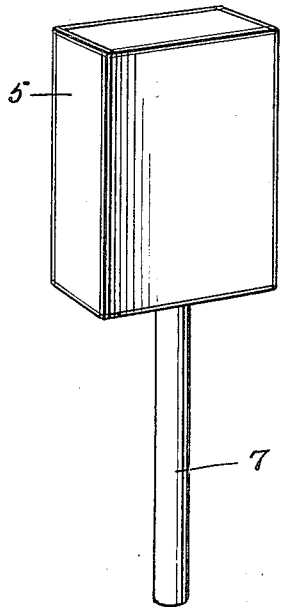
Figure 4 is a perspective view of a modified form of the invention.
Figure 5:
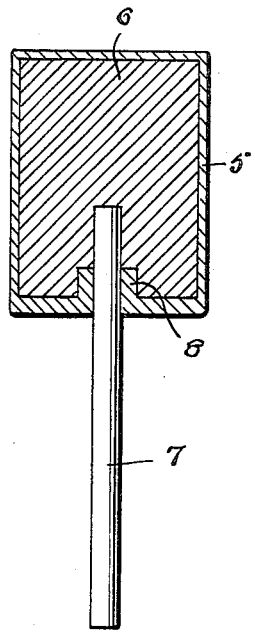
Figure 5 is a sectional view taken therethrough and showing the handle in elevation.
Figure 6:
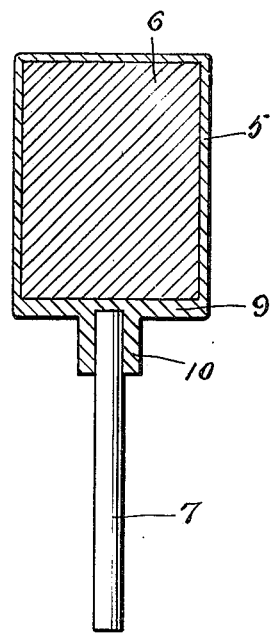
Figure 6 is a similar view of a further modified form.

In the forms of the invention as disclosed in Figures 4 to 6 inclusive, it will be noted that I employ a casing 5 which has its sides and ends closed, and the casing in these forms of the invention is likewise made from chewing gum of any desired kind and flavor, while the filler or contents 6 of the casing is a frozen edible product such as ice cream and similar to the product 3.

In the closed casing forms of the invention I employ a handle 7 in the form of a stick, and in the forms as shown in Figures 4 and 5, the stick is passed through the bottom of the casing, the bottom shown as being thickened and provided with an enlargement 8 formed and provided centrally thereof and rising therefrom as clearly shown in Figure 5. This enlargement 8 acts in the capacity of reinforcing the bottom.

In the form as shown in Figure 6, it will be noted that the bottom which is indicated by the reference numeral 9 is likewise thicker than the remaining walls of the casing and depending from the bottom 9 is a collar 10, the collar being provided for receiving the handle as shown.

While the forms of the invention as shown in Figures 4 to 6 may be wrapped, they can be put on the market in an unwrapped state, and in manufacturing the confection in these forms, the chewing gum is molded or otherwise formed to provide the casing which prior to filling with the edible product such as ice cream, the top thereof is left open and may have depending flanges formed therewith, but in any event the casing is filled with semi-fluid cream or the like to a level adjacent the top edge of the vertical walls, and the top or lid of the casing is then folded downwardly so as to close the open end. The casing together with its contents is then placed in a suitable means for freezing the same, the handles being inserted prior to the filling of the casings with the cream.

In all the forms of the invention, the casings can be made in great numbers and in shapes varying from that shown, as due to the fact that the casings are formed from chewing gum they can be kept a considerable period of time at normal temperature and of course can be shipped after proper packing practically all the seasons of the year.. It may be preferred to make the casings of a shape whereby they can be nested so as to save space in shipping.

From the above description and disclosure of the drawings, it will be obvious that I have provided a confection that is far superior to chocolate covered frozen confections now on the market in many respects, as such frozen confections are generally considered a winter product, because the heat of the fingers coupled with the warm air of the summer months will have a tendency to cause the outer coating of chocolate to get soft and thus soil the hands or face and possibly the clothes, while the container of my invention is formed from chewing gum, a material which may come to the stage of the consistency of putty at summer and body temperatures and will not melt when coming in contact with the fingers. The container of my invention is likewise not brittle and will not break and leave a certain amount of the confection exposed, as often happens in a chocolate coated frozen confection which cannot be cut, as cutting will break and crumble the same, but the confection which forms the subject matter of the present invention can be readily cut into blocks and sections and consumed accordingly, and in fact when the casing is bitten through it will assume the shape of the teeth and therefore the portion of the casing remaining after taking the bite will retain its contents in a secure manner.

While it is obvious that chewing gum in a frozen state is normally brittle at temperatures as low as zero centigrade, when the casing is filled, the chewing gum assumes a flexible plastic state by reason of the action of its contents thereon. This action accounts for the advantages derived from the chewing gum casing as above set forth, and especially the advantage of the gum in not breaking and crumbling. This action takes place in approximately the length of time it would take the manufacturer to make the product, freeze it, deliver it to the retailer, and thence to the consumer.

The invention is susceptible of various changes in its form, proportions and minor details, and the right is herein reserved to make such changes as properly fall within the scope of the appended claims.

What I claim is:

1. A confection comprising a relatively flexible chewing gum casing and a mass of frozen delicacy retained therein.

2. A confection comprising a relatively flexible chewing gum casing and a mass of frozen delicacy retained therein, said casing being relatively thin but of sufficient thickness to form a self-sustaining and form retaining casing.

3. A confection comprising a relatively flexible chewing gum casing and a mass of ice cream retained therein.

4. A confection comprising a relatively flexible chewing gum casing and a mass of ice cream retained therein, said casing being relatively thin but of sufficient thickness to form a self-sustaining and form retaining casing.

5. A confection consisting of a relatively flexible chewing gum casing having an open top and a mass of frozen delicacy retained therein.

6. A confection comprising a relatively flexible chewing gum casing, a mass of frozen delicacy retained therein, a handle in the form of a stick for the confection, a reinforced portion included in said casing, and means formed with said reinforced portion for receiving the handle.

In testimony whereof I affix my signature.

EDWARD L. GORDON.